United States Patent [19]

Kay

[11] 4,234,162

[45] Nov. 18, 1980

[54] VALVES FOR THE CONTROL OF PRESSURE FLUID

[76] Inventor: Francis X. Kay, The School House, Addington, Buckinghamshire, England

[21] Appl. No.: 895,445

[22] Filed: Apr. 11, 1978

[30] Foreign Application Priority Data

Apr. 18, 1977 [GB] United Kingdom ............... 16077/77

[51] Int. Cl.³ ..................... F16K 11/07; F16K 3/24
[52] U.S. Cl. .................................... 251/175; 251/324; 251/DIG. 1
[58] Field of Search ................. 251/DIG. 1, 175, 324; 137/312

[56] References Cited

U.S. PATENT DOCUMENTS

| | | | |
|---|---|---|---|
| 2,666,614 | 1/1954 | Grove et al. | 251/DIG. 1 |
| 2,713,989 | 7/1955 | Bryant | 251/DIG. 1 |
| 3,191,626 | 6/1965 | Leibfritz | 251/DIG. 1 |
| 3,203,664 | 8/1965 | Ver Nooy | 251/DIG. 1 |

*Primary Examiner*—Arnold Rosenthal
*Attorney, Agent, or Firm*—Kurt Kelman

[57] ABSTRACT

A pressure fluid control valve has a seal comprising a sealing element housed in a recess that is provided with a vent arranged automatically to relieve pressure in the recess if the sealing element is subject to excessive distortion.

7 Claims, 5 Drawing Figures

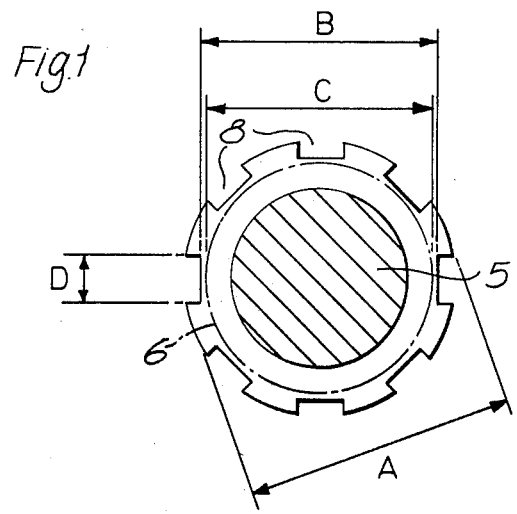
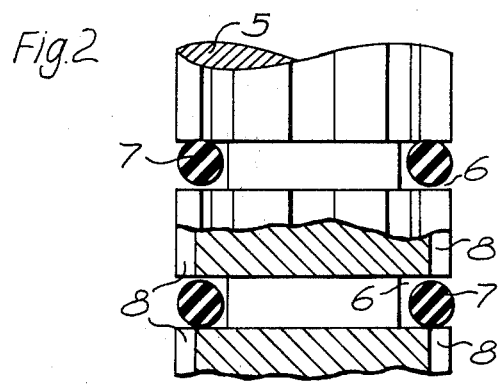
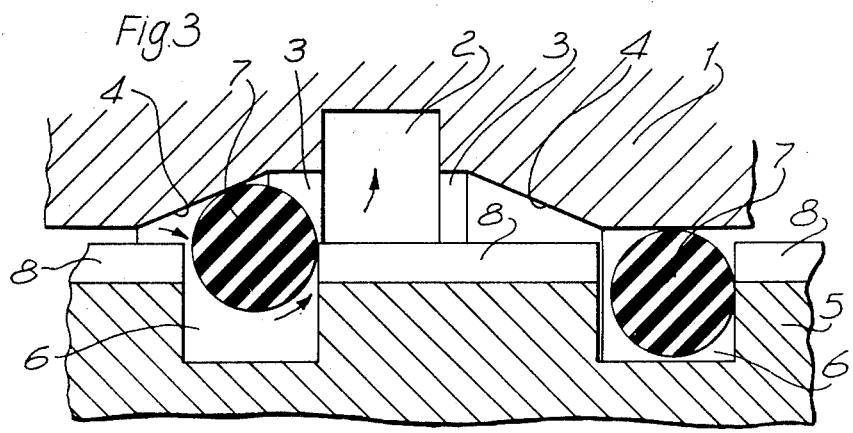

VALVES FOR THE CONTROL OF PRESSURE FLUID

FIELD OF THE INVENTION, ITS BACKGROUND AND THE PRIOR ART

The invention concerns valves for the control of pressure fluid and is especially concerned with the sealing arrangements by which interport and other unwanted leakages are prevented. Although the invention has particular application to valves of the construction characterised by a plunger or shuttle-like mobile member that moves within a valve body to control the communication between sets of ports in the latter, it will become apparent that the invention is of more general utility, being applicable to any valve construction in which a mobile member controls communication between ports in a valve body and unwanted interport and other leakages of the controlled pressure fluids are restrained by a flexible or resilient sealing element that is of strip-like form, double-ended or formed into a loop, and housed in a recess in the mobile member or valve body in such manner as to be distorted into sealing engagement with appropriate surfaces of the recess, mobile member and valve body by the fluid pressure differential tending to cause an unwanted leakage past the sealing element. Accordingly, whereas the invention is applicable to a wide variety of valve constructions, for instance to sliding plate valves and poppet valves, for convenience it will be described and discussed with reference to its application to valves having a plunger or shuttle-like mobile member. Valves of this construction are of two types, those having the sealing elements fitted to the mobile member and those having the sealing elements fitted to the valve body.

When the sealing elements are fitted to the valve body the mobile member has peripheral grooves and is spool-like in shape so that the valve is generally designated a "spool valve", whereas when the sealing elements are fitted to the mobile member the valve is generally described as a "piston valve". In general, the piston valve has the more simple construction, whereas the spool valve, although of more complicated construction, usually has the advantage of larger fluid flow capacity for a given physical valve size, and a better seal life expectancy because the seals are fixed with respect to the ports and the mobile member can be shaped to give smooth seal engagement and release.

The seals commonly used in valves of this class are made from an elastomeric material such as, for instance, neoprene or nitrile rubber. The seal design and material are so chosen that under pressure from the fluid controlled by the valve a seal will undergo deformation to provide pressure-tight sealing against the surfaces with which it is engaged. Considerable care is necessary in the choice of seal design and material for a particular duty in order to avoid both leakage arising from inadequate seal deformation under working pressures and also excessive deformation likely to cause damage to the sealing surfaces engaged by a seal.

In spool valve designs, the shape of the mobile member includes chamfered or radiused lands for the isolation and interconnection of the various ports in the valve body as the spool is shifted. Seals such as O-rings are located in the body between the ports therein, in grooves that are usually defined by spacers of suitable configuration. Such spacers have radial holes for the passage of the controlled pressure fluid and if the seals are of the O-ring type, the ends of the spacers are usually shaped in such a way as to provide restraint to prevent inward collapse of the seal elements into the spool grooves during movement of the spool. In some cases, however, especially when the seals are of a composite form that is intrinsically non-collapsible, the spacers do not require to have specially shaped ends to restrain the seals. In general, however, seal restraint against collapse is required when the valve is to control fluid under relatively high pressure.

In piston valve designs the seals move relatively to the ports and traverse some at least of the latter. For this reason it is most usual to arrange the porting in a bush that fits into the valve body so that the ports subject to seal traverse may take the form of a large number of small diameter holes into which a seal passing thereover has little opportunity to have its surface extruded and so be subject to wear and/or damage. However, such a bush, with its large number of small diameter holes is relatively costly to manufacture, and the many small diameter holes break up the flow of pressure fluid through the port and cause loss in efficiency. Moreover, when a valve of this construction is used to control fluid at high pressures, some deformation of seal surface into the holes during movement of the piston is almost inevitable, with consequent wear of the seals.

A less common form of piston valve construction involves ports in the form of narrow annular slots in a bush or bush assembly fitted to the valve body. This design can give a better fluid flow, for a given total port size, than the described port design involving many small holes but there remains some tendency for the seal surface to extrude into the annular slots as the piston moves, especially when the valve has to control a fluid at relatively high pressure. On the other hand, this design has an additional advantage in that the valve can be constructed to accomplish the required changeover of port interconnection with a very short travel of the mobile member, because the required travel is determined by the port width that can be narrow in the case of annular slot-like ports.

THE INVENTION

The invention has for its object the provision of valve sealing arrangements that avoid or minimise the need for sealing element restraint against excessive deformation, such as collapse or overexpansion in the case of spool valves and piston valves, when unsupported, in valves intended, especially, for high pressure applications.

Thus the invention provides a pressure fluid control valve having a mobile member movable relative to a valve body to control the communication between ports in the latter, at least one seal comprising a sealing element housed in a recess defined in one of said mobile member and said valve body and adapted for deformation into sealing engagement with a wall of said recess and with a sealing surface on the other of said mobile member and valve body, in a port-closing position of the mobile member, by fluid pressure acting on said sealing elements and a recess vent controlled by said sealing element and responsive to excessive deformation thereof upon movement of the mobile member to a port-opening position thereof, to relieve the pressure acting on said sealing element and causing said deformation thereof.

By "excessive deformation" in this context, I mean deformation beyond that required, in the port-closing position of the mobile member, satisfactorily to limit leakage past the sealing elements under the pressure differential applied to the sealing elements.

The recess vent may take a variety of forms, depending upon the general configuration of the sealing element and of the valve in which it is incorporated. In general, however, the recess vent includes a vent opening in a downstream wall of the recess and positioned to be covered and thereby closed by the sealing element when this is performing its sealing function—i.e. is undistorted or is subject only to normal sealing distortion under a pressure differential—m when the mobile member is in its port-closing position, the vent opening being however so positioned as to become uncovered as a result of excessive sealing element distortion in the above-defined sense.

Depending upon requirements, there may be one or a plurality of vent openings, a series of regularly spaced vent openings distributed along the length of the said downstream wall of the recess being preferred in most cases in order to achieve rapid and uniform release of pressure within the recess in response to excessive sealing element distortion.

In the case of a spool valve having a sealing element in the form of a sealing ring housed in a recess in the valve body, the recess vent may be constituted by at least one opening or groove formed in the inner periphery of the recess wall that is on the downstream or low pressure side of the recess when the mobile member is in its port-closing position, the depth of said opening or groove being such that it is normally covered by the sealing ring but extends beyond the outside diameter of that ring when the ring is subject to excessive distortion and incipient inwards collapse as a result of movement of the mobile member or valve spool towards its port-opening position under conditions of high pressure differential acting on the sealing ring.

Alternatively, in such a valve and seal configuration the recess vent may comprise at least one opening at the base of the downstream wall of the seal recess, such opening leading to a suitable low pressure area such as the outlet or equivalent port related to the seal, the opening being arranged so as to be covered and closed by the sealing ring under normal sealing conditions but to be uncovered by excessive deformation of the sealing ring thereby to relieve the fluid pressure, in the seal recess, causing such excessive distortion.

It should be understood that the seal recess in such constructions may be defined, as usual, in part by spacer rings fitted within the valve body or the seal recess may be formed directly in the valve body if required: in the latter case, the recess vent may conveniently be formed by longitudinal grooves in the valve body bore.

In the case of a piston valve, the recess vent for a sealing element thereof in the form of a sealing ring housed in a recess in the valve piston may most conveniently be formed by one or more openings or longitudinal grooves on the piston on the downstream side of the recess, the depth of such opening(s) or groove(s) being such as to be covered by the sealing ring, housed in the recess, when performing its sealing function—i.e. when undistorted or in its normal sealing condition—with the piston in a port-closing position, but to be uncovered by the inner periphery of the sealing ring upon expansion thereof as a result of the pressure differential acting thereon when the piston moves towards its port-opening position and the outer surface of the ring becomes unsupported.

Recess vent openings may also be provided in the upstream wall of a sealing element recess. Such an upstream recess vent, formed for instance by one or more openings or grooves similar to those that may constitute a downstream recess vent as above described, may serve for control of the pressure differential across the sealing element during relieving of pressure in the recess by the opening of the downstream recess vent. For such pressure differential control purposes the upstream recess vent may have a fluid flow resistance different from that offered by the downstream recess vent, for instance by having different cross-sectional areas for the respective vents.

THE DRAWINGS

The accompanying drawings illustrate certain embodiments of the invention and also certain prior art arrangements for comparison therewith. In the drawings:

FIG. 1 is a cross-section of the piston of a piston valve incorporating the present invention;

FIG. 2 is a scrap view of a part-sectional elevation of the piston of FIG. 1;

FIG. 3 is a part longitudinal section of a piston valve incorporating the piston of FIGS. 1 and 2;

DESCRIPTION OF PREFERRED EMBODIMENTS

Figure 4:
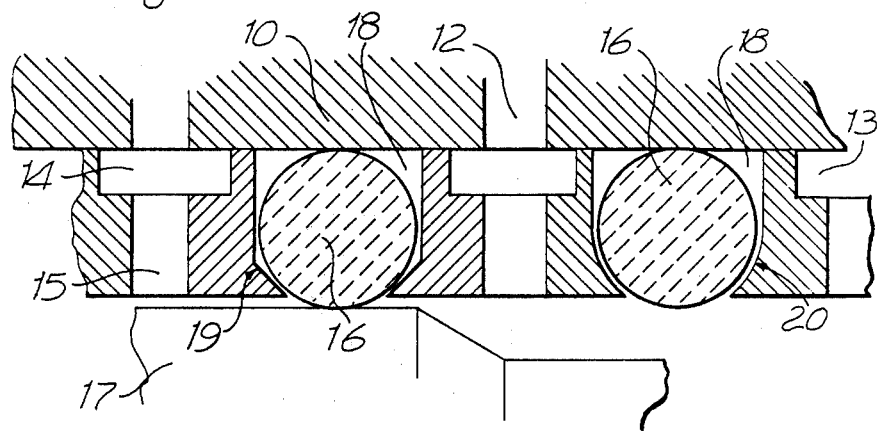
FIG. 4 is a view similar to FIG. 3 but illustrating a spool valve having seals of conventional form.

FIGS. 1 to 3 illustrate a piston valve fitted with seals in accordance with the present invention. For the purposes of illustration these Figures show a part of the piston of such a valve fitted with two seals to co-operate with one port in the body of the valve.

As shown in FIG. 3 the valve comprises a body 1 formed with a port in the form of an annular groove 2 opening into a wider but shallower groove portion 3 having ramped walls 4. The valve further comprises a piston 5 fitted with a pair of seals each comprising a recess 6 and a sealing element in the form of an O-ring 7. As best seen in FIGS. 1 and 2, the piston 5 has external longitudinal grooves 8 of a depth less than the depth of the seal recesses 6. Thus referring to the sectional view in FIG. 1, the dimension "A" is the overall diameter of the piston and corresponds with the bore diameter in the valve body 1, with suitable running clearance, while the dimension "C" represents the base diameter of the groove 6. The dimension "B" represents the root diameter of the grooves 8 and as is apparent dimension "B" is greater than dimension "C". The dimension "D" is the width of the groove 8.

The difference between dimensions "B" and "C" is related to the design and dimensions of ring 7 and the amount by which the latter is to be permitted to overexpand before recess venting and pressure relieving occurs.

The dimensions "B" and "D" in particular, are determined by the cross-sectional shape and area of the seals, by the hardness of the material from which the seals are made, and by the fluid flow that the grooves 8 must pass to provide a required decrease in pressure differential across a seal during opening of a flow path to a port controlled by that seal.

The dimension "D" is determined, having regard to the foregoing factors, by the degree to which the seal may be allowed to distort into the grooves 8 when performing its sealing function to prevent fluid flow to a port controlled by the seal. This dimension therefore takes account of the fluid pressure differential to which the seal may be exposed in operation.

The dimensions "B" and "D" together determine the cross-sectional area of each groove 8 so that the total cross-sectional area available for pressure-relieving fluid flow is determined by the number of grooves 8 as well as by these dimensions.

Experience shows that dimension "D" is the most critical and should usually be within the range 0.005 to 0.062 inch (0.127 to 1.57 mm) and preferably within the range 0.015 to 0.025 inch (0.381 to 0.635 mm). Grooves 8 having widths of such dimensions can conveniently be formed by usual manufacturing techniques. It has been found that with grooves having these width dimensions, seal materials of the hardness typically used do not distort unacceptably into the grooves under required working pressure differentials. For instance, a valve having eight grooves of these width dimensions on a piston having a diameter of 0.625 inch (15.88 mm) and fitted with O-ring seals of elastomeric material of 90° shore hardness has operated satisfactorily at pressures up to 10–12 atmospheres.

FIG. 3 illustrates the situation obtaining during motion of the valve piston 5 (to the right as seen in FIG. 3) from a port-closing to a port-opening position, the port 2 being assumed to be an outlet or exhaust port that in the port-opening position of the piston 5 is to receive fluid from another port, not shown but disposed in the body 1 to the left of the valve part represented in the drawing.

When the piston 5 is in the port-closing position the lefthand sealing ring 7 rides on the normal bore surface of the valve body, whereas the righthand sealing ring is within the area of the port, perhaps to permit fluid to flow thereto from another port to the right of the represented valve port. In the port-closing position pressure to the lefthand side of the lefthand sealing ring 7 causes this to be displaced towards the righthand side of its recess 6 to seal against the downstream (righthand) wall of that recess and against the bore of the valve body 1. The depth of the groove 8 is such that in this "normal" sealing condition of the sealing ring 7, the whole of the groove lies outside the mean diameter of the sealing ring 7 and is thus covered and closed by the latter.

Reverting to the condition illustrated in FIG. 3, it will be seen that in moving to the right from the described port-closing position, the lefthand sealing ring 7 has moved off the normal bore surface of the valve body 1 and has expanded so as to remain in contact with the ramped groove wall 4, this expansion of the ring 7 being the result of the fluid pressure within the seal recess 6 and that was previously acting to hold the sealing ring 7 sufficiently firmly against the bore surface of the valve body to prevent fluid flow past the sealing ring towards the port 2.

However, as indicated this overexpansion of the lefthand sealing ring 7 has resulted in its moving up the downstream (righthand) wall of the recess 6 to a sufficient extent to uncover the grooves 8 therein and so allow the fluid within the recess 6 to escape by the route indicated by the arrows. Thus the pressure acting on the sealing ring 7 to expand this and tending to keep it in contact with the groove wall 4 is automatically relieved when the ring 7 has overexpanded to an extent sufficient to uncover the grooves 8, whereby the sealing ring 7 is permitted to return to its normal, undistorted configuration to provide a clear fluid flow path to the port 2.

Figure 5:
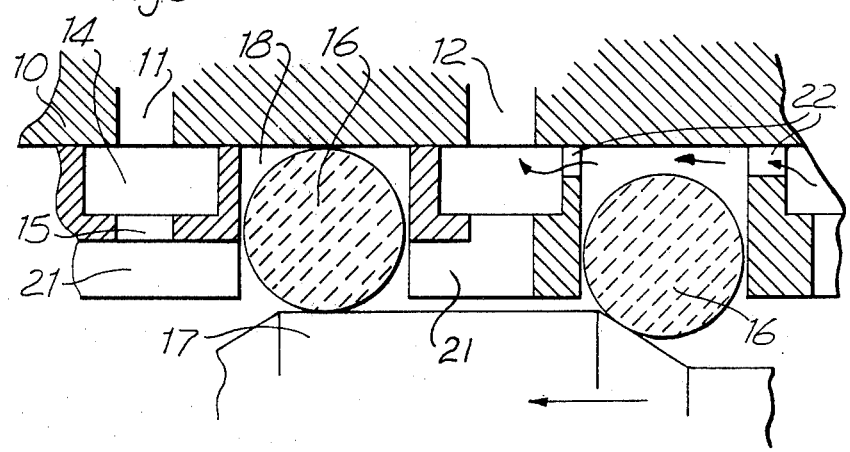
FIG. 5 is a view corresponding with FIG. 4 but illustrating a spool valve equipped with seals in accordance with the present invention.

FIGS. 4 and 5 respectively illustrate a conventional spool valve construction and a spool valve incorporating seals in accordance with the invention. Both these Figures are composite, illustrating in the case of FIG. 4 two forms of conventional seal restraint and, in the case of FIG. 5, two seal recess venting arrangements.

In both Figures, parts having equivalent functions are identified by the same reference numeral.

Thus the spool valves illustrated each comprise a body 10 having ports such as shown at 11, 12 and 13 formed partly in the body 10 and partly in spacer rings having peripheral grooves 14 and port openings 15 and that define recesses in which are housed sealing elements in the form of O-rings 16.

The valve further comprises a mobile member in the form of a spool 17 that in FIG. 4 is shown in a port-opening position in which it permits a fluid to flow to the port 12 from the port 13, and in FIG. 5 in a position approaching the port-opening position in the course of its movement, in the direction indicated by the arrow, from a port-closing position in which the righthand sealing ring 16 rides on the larger diameter portion of the spool 17.

As indicated in FIG. 4, the spacer rings are shaped so as to define seal recesses 18 that have lips defining an opening narrower than the sealing ring so as to restrain this against radial inwards collapse when the ring is unsupported by engagement with the spool 17. The lefthand sealing ring 16 of FIG. 4 is shown housed in a seal recess with bevelled lips 19 whereas the righthand sealing ring 16 is shown housed in a sealing recess 18 having curved wall portions 20 defining the required lips.

In the spool valve in accordance with the present invention shown in FIG. 5, no such sealing ring restraint arrangements are required. Instead recess venting arrangements are provided for each of the seal recesses 18 and in the case of the left-hand seal the venting arrangements for the recess 18 are constituted by longitudinal grooves 21 in the spacer ring on at least the downstream side (the righthand side in FIG. 5) of the recess to provide for flow pressure fluid from the recess 18 to the port 12 upon incipient inwards collapse of the sealing ring when unsupported by engagement with the spool 17. This arrangement is functionally equivalent to that of the grooves 8 in the piston 5 of the piston valve illustrated in FIGS. 1 to 3.

The righthand side of FIG. 5 illustrates an alternative recess venting arrangement involving vent openings 22 in the spacer rings at the base of the seal recess 18 defined therebetween to provide for direct flow of fluid between the ports 13 and 12 when the sealing ring 16 has been distorted, by the pressure within the seal recess 18, upon becoming unsupported by movement of the spool 17 towards its port-opening position. This flow of fluid is indicated by the arrows in FIG. 4.

Because a spool valve having seals in accordance with the invention requires no seal restraint arrangements such as illustrated in FIG. 4, its seal recesses may in suitable cases be formed directly in the valve body, e.g. by machining casting or moulding techniques, avoiding the complication of spacer rings. The required recess venting arrangements may in such a case be provided by one or more longitudinal grooves formed in the bore of the valve body to be equivalent to the grooves in the spacer rings of the lefthand seal in FIG. 5.

Although in the illustrated arrangements sealing rings of the O-ring type have been described it should be understood that the invention is equally applicable to sealing rings having other cross-sectional shapes, for instance square or X-section rings.

I claim:
1. A pressure fluid control valve, comprising:
   (a) a valve body member having ports therein;
   (b) a mobile valve control member movable relative to the valve body member between a port-closing position and port-opening position to control communication between the ports in the valve body member,
      (1) one of said members defining a recess having an upstream wall and a downstream wall, and
      (2) the other member having a sealing surface facing the recess;
   (c) a seal including a sealing element floatingly housed in the recess, said sealing element, sealing surface and recess being dimensioned and positioned such that said sealing element is deformed into sealing engagement with one of the recess walls and with the sealing surface, in the port-closing position of the mobile valve control member, solely by fluid pressure acting on the sealing element; and
   (d) a recess vent comprising at least one longitudinal groove formed on the surface of said member defining a recess and having a vent opening at one end thereof which opens into the downstream wall of said recess, said groove having a depth less than that of said recess and being disposed directly adjacent to said sealing surface, said groove being dimensioned and positioned such that it is covered, and thereby closed, by the sealing element, when the latter is performing its sealing functions, and is uncovered when said sealing ring is subjected to excessive distortion during its movement relative to the valve body member to a port-opening position, under conditions of a high pressure differential acting on the sealing ring, so as to relieve the fluid pressure acting on the sealing element and causing the excessive deformation thereof.

2. The valve of claim 1, comprising a plurality of said vent openings.

3. The valve of claim 1 in which said sealing element is a sealing ring and the recess is in the valve body member, and said recess vent comprises at least one groove formed in the inner periphery of the downstream recess wall, the groove being of a depth such that it is normally covered by the sealing ring but extends beyond the outside diameter of that ring when the ring is subject to the excessive deformation.

4. The valve of claim 3 in which the valve body member has a bore receiving the valve control member, and the recess vent comprises longitudinal grooves in the bore.

5. The valve of claim 1 in which said sealing element is a sealing ring and the recess is in the valve body member, and said recess vent comprises at least one opening at the base of the downstream wall of the seal recess, said opening being positioned to be covered and closed by the sealing ring under normal sealing conditions but to be uncovered by the excessive deformation of the sealing ring.

6. The valve of claim 1 in which said mobile valve control member is a piston, said sealing element is a sealing ring and the recess is in said piston, said recess vent comprising at least one longitudinal groove on the piston leading from the downstream wall of the recess, the groove having such depth as to be covered by the sealing ring in the sealing position.

7. The valve of claim 1 in which the recess vent includes vent openings in both walls of the recess.

* * * * *